UNITED STATES PATENT OFFICE.

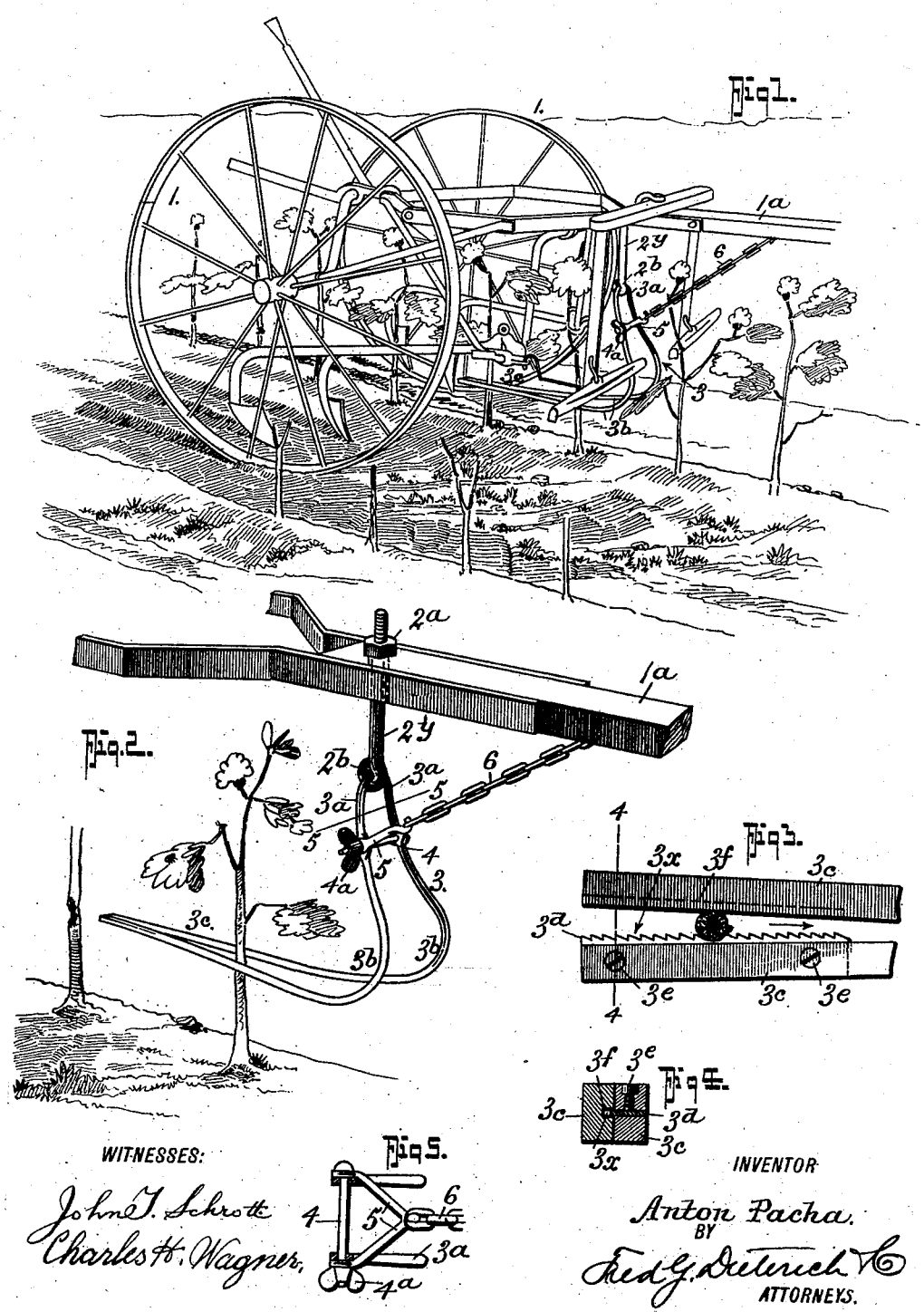

ANTON PACHA, OF TAYLOR, TEXAS.

COTTON-CULTIVATOR.

No. 915,693.     Specification of Letters Patent.     Patented March 16, 1909.

Application filed December 28, 1908. Serial No. 469,517.

*To all whom it may concern:*

Be it known that I, ANTON PACHA, residing at Taylor, in the county of Williamson and State of Texas, have invented certain new and useful Improvements in Cotton-Cultivators, of which the following is a specification.

In the growth of cotton I have found that the cotton plants during cultivation do not all grow to the same heights, some plants growing higher than others. Furthermore, it usually occurs that the taller plants possess fewer cotton bolls and yield less cotton than those plants which have not grown to a considerable height.

On examining the plants of stunted growth, I have found indications of the stalk of the plant having been scratched or wounded during its growth, and hence the growth of the plant stunted. The cotton plants whose growth has been stunted through injury, either due to storms or to the cultivating implements injuring the plants, do not yield any less amount of cotton, but on the contrary the yield of cotton is greater on such plants than on those which grow to full height uninjured.

It is therefore my object to provide a device which may be attached to the ordinary cotton cultivators that will in passing over the plants scratch the stalks of each plant uniformly so as to uniformly stunt the growth of the plant. I have also found with the plants whose growth has been stunted by scratching the plants, the scratch heals up during the further growth of the plant and the plants so scratched do not grow to their full height. It appears that the strength of the plants instead of being used in the stalk in growing is transmitted into the bolls, and hence a plant so scratched will yield better and a more abundant supply of cotton.

Generically my invention consists of a pair of resilient arms having a saw-like member which when the arms pass over the plants will scratch a groove in one side of the stalk, thus accomplishing the purpose of my invention.

More specifically my invention embodies certain novel details of construction, combination and arrangement of parts all of which will be first fully described and then be specifically pointed out in the appended claims, reference being had to the accompanying drawings, in which:—

Figure 1, is a perspective view of a cultivator with my invention applied. Fig. 2, is an enlarged perspective view of my invention. Fig. 3, is an enlarged top plan view of a portion thereof showing the fingers engaging a stalk. Fig. 4, is a section on the line 4—4 of Fig. 3, the fingers being closed. Fig. 5, is a detail section taken substantially on the line 5—5 of Fig. 2, the bearings for the member 4 being shown in section.

Referring now to the accompanying drawings in which like letters and numerals of reference indicate like parts in all of the figures 1 designates the cultivator, which may be of any approved construction and which has the usual draft tongue $1^a$ to which my invention may be applied.

My improved plant scratching mechanism comprises an eye-bolt $2^y$ loosely movable in an aperture in the tongue $1^a$ and adjusted by means of a nut $2^a$ on the threaded end of the eye-bolt. Passing through the eye $2^b$ of the eye-bolt is a resilient member 3 which consists of a U-shaped portion $3^a$ merging with runner-like portions $3^b$ whose ends $3^c$ are projected rearwardly and terminate closely together. One of the ends $3^c$ carries a removable saw-blade $3^d$ that is held in place by set screws $3^e$ and when the ends $3^c$ are in contact the projecting edge $3^x$ of the saw-blade $3^d$ enters a slot $3^f$ in the opposing section, so as to protect the saw-blade $3^d$.

4 designates a bolt secured to one of the legs of the U-shaped portion $3^a$ and projecting through an aperture in the other leg of the U-portion $3^a$, a nut $4^a$ being provided on the bolt 4, by means of which the tension of the resilient members 3 may be regulated to bring the runner-like members $3^b$ closer together or allow them to spring farther apart, as conditions may require.

5 designates a hook member secured to the bolt 4, to which a chain 6 is secured, the chain 6 being also secured to the tongue $1^a$ to serve as a dragging medium for the resilient scratcher 3.

In the practical application of my invention as the scratcher is drawn over the plants at the proper time, the plants will pass between the spreader portions of the runner-like arms $3^b$ and will be scratched by the file or saw-blade $3^d$, thus wounding the plant and causing its growth to be stunted. By mounting the bolt 2 for vertical movement in the tongue or support $1^a$, should any obstructions be encountered the scratcher 3 will rise there-over, the bolt 2 moving upwardly in its aperture so as to prevent breaking the device.

From the foregoing description taken in connection with the accompanying drawings, it is thought the complete construction, operation and numerous advantages of my invention will be readily understood by those skilled in the art to which the invention appertains, and I desire to say that slight changes in the details of construction, combination and arrangement of parts, and the proportion and materials of manufacture may be varied to suit the requirements of the trade without departing from the spirit of the invention and the scope of the appended claims.

What I claim is:

1. In an apparatus of the class described, a movable support, a scratcher having provisions for straddling a plant and scratching the stalk thereof as it is drawn over the plant, and means for mounting the scratcher on the support.

2. In an apparatus of the class described, a movable support, a scratcher having provisions for straddling a plant and scratching the stalk thereof as it is drawn over the plant, and means having vertical movement in the support for mounting the scratcher on the support.

3. In an apparatus of the class described, a movable support, a scratcher having provisions for straddling a plant and scratching the stalk thereof as it is drawn over the plant, means for mounting the scratcher on the support, said scratcher comprising a resilient member having runner-like portions spaced apart to permit the passage of the plant and having contacting ends, and means carried by one of said ends for scratching the plant as the runners pass there-over.

4. In an apparatus of the class described, a movable support, a scratcher having provisions for straddling a plant and scratching the stalk thereof as it is drawn over the plant, means having vertical movement in the support for mounting the scratcher on the support, said scratcher comprising a resilient member having runner-like portions spaced apart to permit passage of the plant and having contacting ends, and means carried by one of said ends for scratching the plant as the runners pass there-over.

5. In an apparatus of the class described, a movable support, a scratcher having provisions for straddling a plant and scratching the stalk thereof as it is drawn over the plant, means for mounting the scratcher on the support, said scratcher comprising a resilient member having runner-like portions spaced apart to permit passage of the plant and having contacting ends, means carried by one of said ends for scratching the plant as the runners pass there-over, and means for adjusting said runner-like members.

6. In an apparatus of the class described, a movable support, a scratcher having provisions for straddling a plant and scratching the stalk thereof as it is drawn over the plant, means having vertical movement in the support for mounting the scratcher on the support, said scratcher comprising a resilient member having runner-like portions spaced apart to permit passage of the plant and having contacting ends, means carried by one of said ends for scratching the plant as the runners pass there-over, and means for adjusting said runner-like members.

7. An apparatus of the class described, comprising a support, a bolt vertically and adjustably movable in said support, a scratcher carried by said bolt and comprising a resilient member having a U-shaped portion merging with runner-like portions spaced apart to permit passage of the plant and having their ends normally held in contact with one another, means carried by one of said ends for scratching the plant and means carried by the U-shaped portion for regulating the contacting force of said ends, and a chain secured to the support and to said scratcher.

8. An apparatus of the class described, comprising a support, a bolt vertically and adjustably movable in said support, a scratcher carried by said bolt and comprising a resilient member having a U-shaped portion merging with runner-like portions spaced apart to permit passage of the plant and having their ends normally held in contact with one another, means carried by one of said ends for scratching the plant and means carried by the U-shaped portion for regulating the contacting force of said ends, a chain secured to the support and to said scratcher, said scratching means comprising a saw-blade removably carried by one of said ends, the other end having a groove to receive the saw-blade when the ends are in contact.

ANTON PACHA.

Witnesses:
F. L. WELCH,
F. O. ALLISON.